United States Patent [19]

Elser et al.

[11] Patent Number: 5,086,687
[45] Date of Patent: Feb. 11, 1992

[54] ROTARY SLIDE VALVE FOR HYDRAULIC AUXILIARY POWER STEERING

[75] Inventors: Dieter Elser, Essingen; Helmut Hetzel, Schwäbisch Gmünd; Walter Kogel, Abtsgmünd, all of Fed. Rep. of Germany

[73] Assignee: Zahnradfabrik Friedrichshafen, AG., Friedrichshafen, Fed. Rep. of Germany

[21] Appl. No.: 328,036

[22] PCT Filed: Sep. 16, 1987

[86] PCT No.: PCT/EP87/00524

§ 371 Date: Jan. 31, 1989

§ 102(e) Date: Jan. 31, 1989

[87] PCT Pub. No.: WO88/01959

PCT Pub. Date: Mar. 24, 1988

[30] Foreign Application Priority Data

Sep. 19, 1986 [LU] Luxembourg ............... 00543

[51] Int. Cl.$^5$ ............... F15B 9/10; B62D 5/06
[52] U.S. Cl. ............... 91/375 A; 137/625.24; 180/143; 180/149
[58] Field of Search ............ 91/47, 51, 375 A, 375 R; 180/141, 142, 143, 149; 137/625.24, 625.3, 625.31, 625.32

[56] References Cited

U.S. PATENT DOCUMENTS

| | | | |
|---|---|---|---|
| 2,992,633 | 7/1961 | Stiglic et al. | 91/375 R |
| 4,173,987 | 11/1979 | Kouda | 180/143 |
| 4,561,516 | 12/1985 | Bishop et al. | 137/625.17 X |
| 4,593,378 | 6/1986 | Honaga et al. | 91/446 |
| 4,756,330 | 7/1988 | Tischer | 137/625.35 X |
| 4,765,428 | 8/1988 | Kawakami et al. | 91/375 A X |
| 4,784,235 | 11/1988 | Ijiri et al. | 180/143 X |
| 4,830,130 | 5/1989 | Miyoshi | 180/141 |
| 4,858,712 | 8/1989 | Neff | 137/625.32 X |
| 4,899,842 | 2/1990 | Emori et al. | 180/142 |

FOREIGN PATENT DOCUMENTS

| | | | |
|---|---|---|---|
| 0295796 | 12/1988 | European Pat. Off. | 180/149 |
| 2579548 | 10/1986 | France | 180/149 |
| 2031826 | 4/1980 | United Kingdom | 91/375 A |

*Primary Examiner*—Edward K. Look
*Assistant Examiner*—John Ryznic
*Attorney, Agent, or Firm*—Albert M. Zalkind

[57] ABSTRACT

An auxiliary power steering mechanism with a working piston installed in the steering gear has a rotary valve comprising a rotary member and a fixed valve sleeve. A piston valve is inserted in a bore provided in the rotary member. The piston valve is connected with an adjustment device, such as an electromagnet, via a tube supported by a torsion bar. The electromagnet adjusts the piston valve as a function of various influencing variables such as speed, and controls the condition of a plurality of hydraulic fluid flow return bores arranged in longitudinally spaced relation in the rotary member for noise-free control of the build-up of pressure in a surge chamber that is active at the moment. The bores have flat portions of different contours and circumferential lengths.

8 Claims, 8 Drawing Sheets

ROTARY SLIDE VALVE FOR HYDRAULIC AUXILIARY POWER STEERING

BACKGROUND OF THE INVENTION

Auxiliary power steering mechanisms are, so designed, in general, that the valve's characteristic curve (working pressure - operating power characteristic curve) has a flat, gradual ascent in a relatively large angle-of-rotation range of the rotary slide valve, and then rises steeply to a maximum value as the operating power increases further. So the driver of the vehicle must turn the steering wheel through a relatively large angle of rotation, when parking and maneuvering, for example, until a greater intensification of power is reached. The two rotary slide members elastically connected with each other by the torsion bar rotate against each other within this angle of rotation. Depending upon the cross section and length of the torsion bar, the driver must apply a more or less large amount of operating power until the rotary slide valve triggers the desired intensification of power. Such a valve characteristic curve, with an initially flat ascent through the angle of rotation, makes very good straight-line travel characteristics possible at higher speeds since the auxiliary power portion remains small and the response within the elastic area of the torsion bar permits a good steering touch. However, the fact that the operating power is relatively high in the slow-travel range is a disadvantage of the characteristic curve characteristic that is synchronized with an exact steering behavior at high speeds.

A rotary slide valve that accomplishes the controlling of pressure so that the opposing demands for lower manual operating power in the slow-travel range and high manual operating power at fast speeds can be satisfied is already known from EP 01 71 247 A2. This known rotary slide valve is a structural part of a rack-and-pinion steering mechanism in which the rotary slide member connected with the steering shaft is connected with the pinion engaging with the steering rack by the torsion bar. The valve sleeve surrounding the rotary member is likewise coupled with the pinion in the direction of rotation with a steering play, but guided axially displaceably on the rotary sleeve. One face of the valve sleeve rests against a spring in the housing while a surge chamber is attached to its other face. This surge chamber lies between the radial return drilled holes in the rotary slide member and the return connection leading to a container. An electro-mechanically activated adjustment throttle is installed in the return connection that controls the return cross section as a function of the speed of travel. In rapid travel, the adjustment throttle is wide open, so that the oil flows unhindered to the return connection. Therefore the valve sleeve remains on the rotary slide member in its initial position, determined by the spring, so that the guide grooves and the guiding edges of the rotary slide valve corresponding to them are available for regulating the pressure along their entire length. This provides a characteristic curve path with a gradual increase of pressure over a relatively large angle-of-rotation range and a further steep increase of pressure only toward the end of the relative rotation of the two parts of the rotary slide valve to each other.

At slow speed (i.e. when parking), the cross-sectional area of an aperture at the adjustment throttle is narrowed down sharply. As a result, a differential pressure builds up in the surge chamber of the valve sleeve that moves it into a final position against the spring resistance. The effective guiding-edge length of the rotary slide valve is shortened, so that the original characteristic curve of the rotary slide valve is changed. The torsion angle between the two rotary slide structural parts needed for regulating the pressure is smaller since the building up of pressure in the active pressure chamber of the working cylinder takes place much faster. This is a result of the reduced regulating cross section. Since the torsion bar consequently must only be rotated through a small angle, the operating power at the steering wheel is also correspondingly smaller. Now the steering power characteristic curve has a very steep path through the angle of rotation. Between the two described positions of the valve sleeve—that is, the initial position and the final position—any intermediate position of the valve sleeve at all is possible as a function of the variable differential pressure. In this way, the valve characteristic curve can be adapted to the driving situation of the moment. For better synchronization of the characteristic curve, the guiding edges of the known rotary slide are provided with short pockets that gradually change into long control slots. The peripheral length of the pockets is larger than the slots.

This known oil return control system for changing the valve characteristic curve is only suitable for steering devices with an axially movable valve sleeve. In steering gears in which such a valve sleeve is secured to another component for structural reasons, the return control system that has been described cannot be used. As a result of the great length of packing on their outer circumference, each axially displaceable valve sleeves are subject to operation.

SUMMARY OF THE INVENTION

Therefore it is an object of the invention to provide a generally applicable return control system. Thus the return control system is to be usable both in connection with coupled axially movable and non-movable valve sleeves.

According to the primary feature of the invention, return drilled holes or bores in the rotary slide member are arranged separately, one behind the other, in the longitudinal direction, for any direction of rotation, so that two rows of drilled holes lying close to each other are provided along the circumference in every case. Each row of drilled holes is assigned to a guide groove in the valve bushing connected with the servomotor. A piston valve guided in a concentric drilled hole in the rotary slide is connected with an adjustment device that adjusts the piston valve as a function of at least one influencing variable to change the return cross section by means of a tube that is supported by the torsion bar. Depending upon the position of the piston valve that is displaceable against spring resistance, a larger or smaller return cross section is available, so that different operating powers are obtained at the steering wheel. Optimally synchronized operating powers can also be produced at all driving speeds by this means with a rotary slide valve with an axially undisplaceable valve sleeve. Here the piston valve sealing metallically in the rotary slide member provides the advantage of functioning with little hysteresis.

An electromagnet is provided as an adjustment device in one embodiment. This is fastened to a casing cover in alignment with the torsion bar and acts upon the piston valve through the tube that is guided through a threaded spindle.

In another embodiment, a piston in alignment with the torsion bar is inserted in a casing cover as an adjustment device for the piston valve. A surface of this piston that is capable of being put under pressure is connected with an interior space in a threaded spindle that conducts the return oil, with an electromagnetic flow control valve being installed in a return channel behind the surface capable of being put under pressure. The flow control valve dams up the return oil more or less, so that the piston movement resulting from the changing pressure is transferred to the piston valve through the tube. Both adjustment devices have the capability to activate the return control device through an electronic control device that can process various influencing factors regarding the driving situation at the moment—speed, transverse acceleration and useful load, for example—and convert them into control signals. The entire return control device, with the exception of the electromagnet and the piston located in the casing cover, can be accommodated within the confines of a commercial steering gear, so that only a little additional structural space is required.

According to one feature of the invention, annular grooves are incorporated in the outer surfaces of the piston valve at approximately the spacing of the radial return drilled holes or bores provided in the rotary slide member, and they are connected with a drilled hole in the piston valve that is connected with a container. These annular grooves control the flow of oil from the return drilled holes to the container. Next to two rows of drilled holes located close to each other and in the middle of them is another return drilled hole located opposite an annular groove, whose cross section, as a residual cross section, is constantly open. In this manner, a return cross section that is changeable in a large area is obtained.

According to another feature of the invention, the return drilled holes are advantageously surrounded by windows that are produced by stamping. The windows have different widths and circumferences, with some of the windows having a sloping outer contour. The windows shaped in this way have the task of carrying out the distribution of the discharge to the drilled hole cross section still open at the moment so that the desired characteristic curve change takes place. Furthermore, the windows ensure that the pressure is reduced over a relatively long flow route. The rows of drilled holes with the windows that go with them are separated from each other hydraulically by an arm running longitudinally. By this means, it is guaranteed that, whatever the direction of rotation of the rows of drilled holes, two of which always lie side by side, only one of them always takes over the exact regulation of pressure—i.e., that bypass streams are avoided. Further, it is important that the centrally located, non-controllable return drilled hole and the window that goes with it are operative in both directions of rotation.

In the normal position of the piston valve—i.e., with the electromagnet not energized—the return drilled holes are completely opened by the spring exerting pressure on the piston valve. An advantage of this is the fact that, in the event of a current failure, the relatively high operating power responsible for a good steering touch can be applied. At the average and higher rates of speed, therefore, which are those that are preponderantly used, good road contact is maintained.

As a result of the fact that the tube that transfers the axial movement to the piston valve has flanges located opposite each other at both of its ends in the area where the torsion bar is pinned, the tube can be moved axially on the torsion bar.

BRIEF DESCRIPTION OF THE FIGURES

Further details concerning the invention are made clearer from a study of the following specification when viewed in the light of the accompanying drawing, in which.

DETAILED DESCRIPTION

Figure 1:
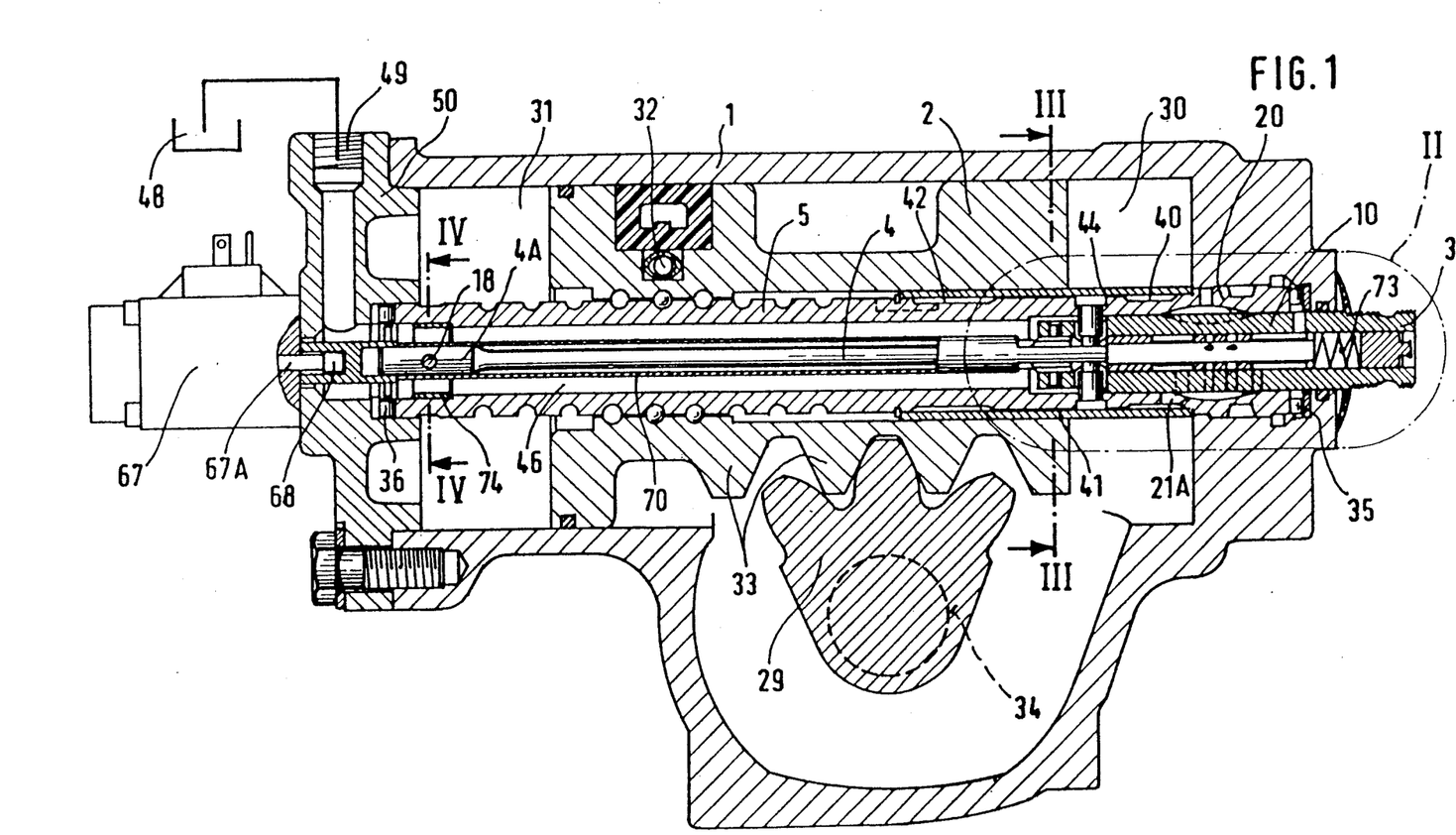
FIG. 1 shows a longitudinal section through a block steering mechanism with a working cylinder fitted therein.

FIG. 1 shows a block steering gear with a working piston 2 fitted into a transmission casing 1. A steering shaft 3 is connected with a threaded spindle 5 by a torsion bar 4. As can best be seen in FIG. 7, the steering shaft 3 includes three axial supply guide grooves 6, 7, 8 at equal angular distances from each other, for example, that belong to a rotary slide member 10.; Between these guide grooves 6, 7, 8, in each case, are two rows 9 and 9A of return drilled holes or bores located one behind the other in the longitudinal direction, and in FIG. 5 there are return drilled holes 11 to 13 and 14 to 16. In the middle of these two rows is another return drilled hole 17 having a larger diameter. The more exact shape of this arrangement of drilled holes and its functioning will be set forth in greater detail later on.

Figure 2:
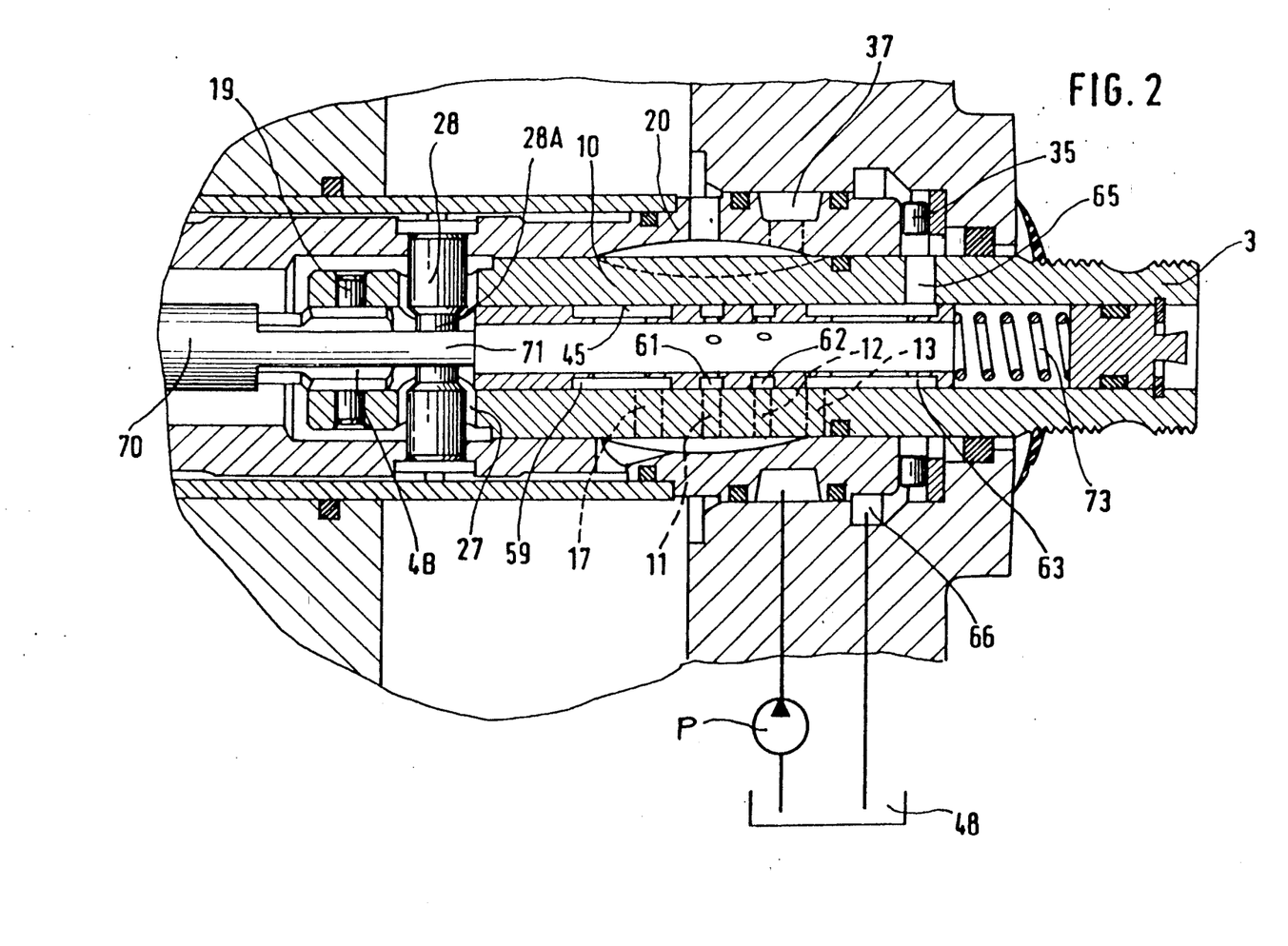
FIG. 2 shows an enlargement of a section of the rotary slide valve encircled by the dash-dot line II in FIG. 1.

The rotary slide member 10 works together with a valve sleeve 20 having axial guide grooves 21, 22, 23 and 24, 25, 26 (FIG. 7) that is manufactured in one piece with the threaded spindle 5. The rotary slide member 10 and the valve sleeve 20 are the structural parts of a rotary slide valve that is usual in such auxiliary power steering mechanisms. A transverse bolt 28 fixed in the threaded spindle 5 and passed through a drilled hole 27 in the steering shaft 3 in the direction of rotation, with play, locates a specific control path between the steering shaft 3 and the threaded spindle 5 (FIG. 2). Within this control clearance, the rotary slide valve controls a pressure chambers 30, 31 in the working piston according to the direction of rotation. The transverse bolt 28 has a recess 28A that will be discussed below. The working piston 2 engages the threaded spindle 5 through an endless bead chain 32 and remains engaged with a steering-worm sector 29 located on a steering worm sector shaft 34 by means of a gearing 33. Axial bearings 35 and 36 serve the purpose of receiving the axial forces acting upon the threaded spindle 5. A pump P driven by a motor vehicle's engine can be connected with the guide grooves 21, 22, 23 and 24, 25, 26 (FIG. 7) in the valve sleeve 20 by an annular groove 37 in the valve sleeve 20 (FIG. 2) and the supply guide grooves 6, 7, 8 in the rotary slide 10. For the sake of simplicity, only the guiding edges 6A and 6B of the supply guide groove 6 controlling the passage of oil are shown in the drawings. The guide grooves 21, 22, 23 are connected with the surge chamber 31 by radial drilled holes—21A, for example—and the guide grooves 24, 25, 26 are connected with the pressure chamber 30 by corresponding radial drilled holes—25A, for example. It can be seen in FIG. 1 how the connection with the pressure chamber 31 runs in the steering gear: The oil's path leads from the radial drilled hole 21A into annular slots 40, 41, 42 between a tube 44 and the threaded spindle 5 and finally into the pressure chamber 31 by way of the spindle screw thread.

A drilled hole 45 in the steering shaft 3 is connected with an interior space 46 in the threaded spindle 5 by the drilled hole 27 of the transverse bolt 28. This interior space 46 is discharged to a container 48 through an outlet connection 49 inn a cover 50.

Figure 5:
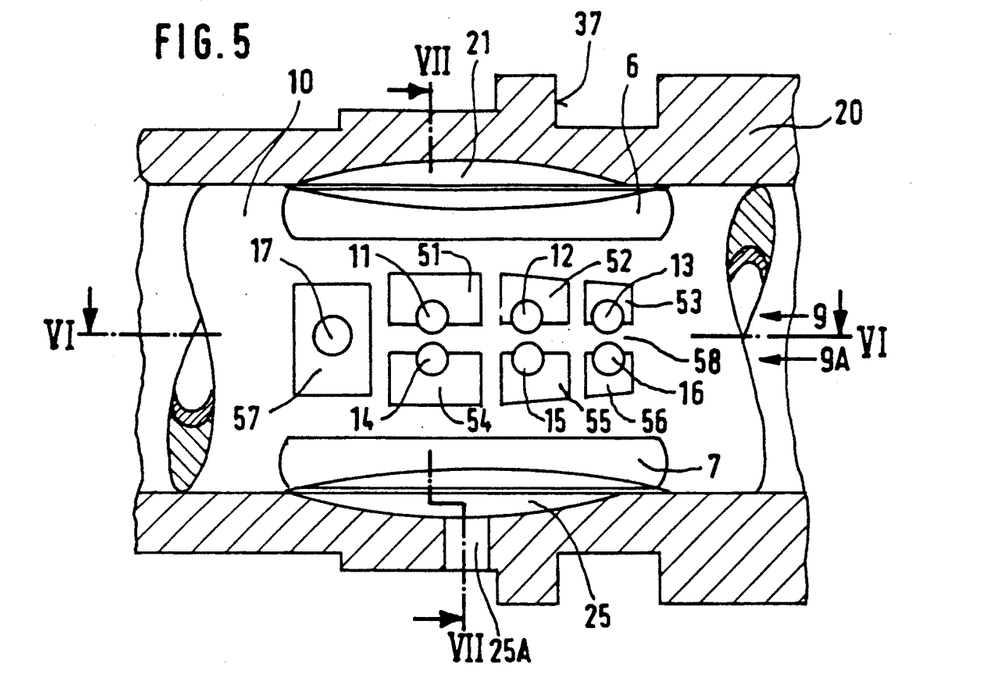
FIG. 5 shows an enlarged partial longitudinal section of the rotary slide valve with the casing omitted.

Every return drilled hole 11 to 17 of the system that can be seen in FIG. 5 has a so-called window 51 to 57 with a very flat throttle cross-section for controlling the pressure. These windows are of different widths and also have different effective lengths because of their sloping outer contour. The window 57 of the return drilled hole 17 for the unchangeable residual cross-section has the shortest circumferential length. The return drilled holes 11, 12, 13 and 14, 15, 16 and the windows belonging to them are separated from each other hydraulically by an arm 58. The system of the return drilled holes is repeated on the rotary slide member 10 a total of three times in the chosen embodiment. However, for easier understandability, the invention is only explained in detail and provided with reference numbers on the basis of one drilled-hole system.

Figure 6:
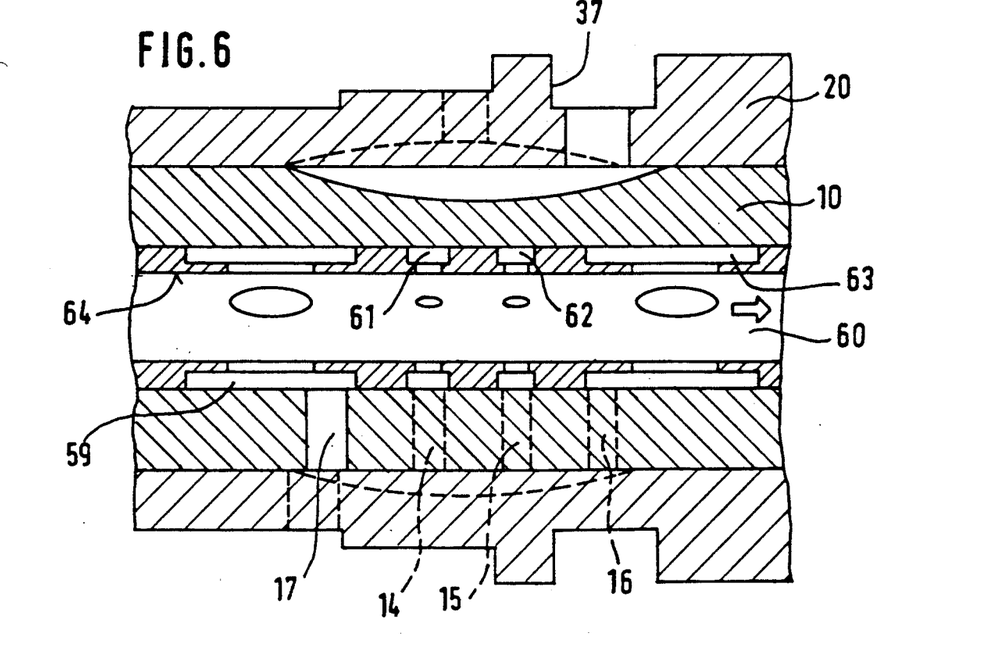
FIG. 6 shows a longitudinal section along line VI—VI in FIG. 5 with the piston valve in the normal position for minimal operating power.

According to FIG. 6, an axially movable piston valve 60 with two short annular grooves 61, 62 and two long annular grooves 59, 63 is guided in the drilled hole 45 of the steering shaft 3. These annular grooves 59, 61, 62 and 63 are connected with the container 48 by a drilled hole 64 in the piston valve 60, the drilled hole 45 and the interior space 46 of the threaded spindle 5. Furthermore, the long annular groove 63 also is connected with the container 48 over another return path—specifically, a radial drilled hole 65 (FIG. 2), the axial bearing 35 and through a casing return groove 66. The annular grooves 61, 62 and 63 always work together with the return drilled holes 11, 12, 13 and 14, 15, 16 according to the position of the distributing slide valve 60. The return drilled hole 17 is connected with the long annular groove 59 in every position of the piston valve 60, that a permanently open residual cross section is present.

Figure 3:
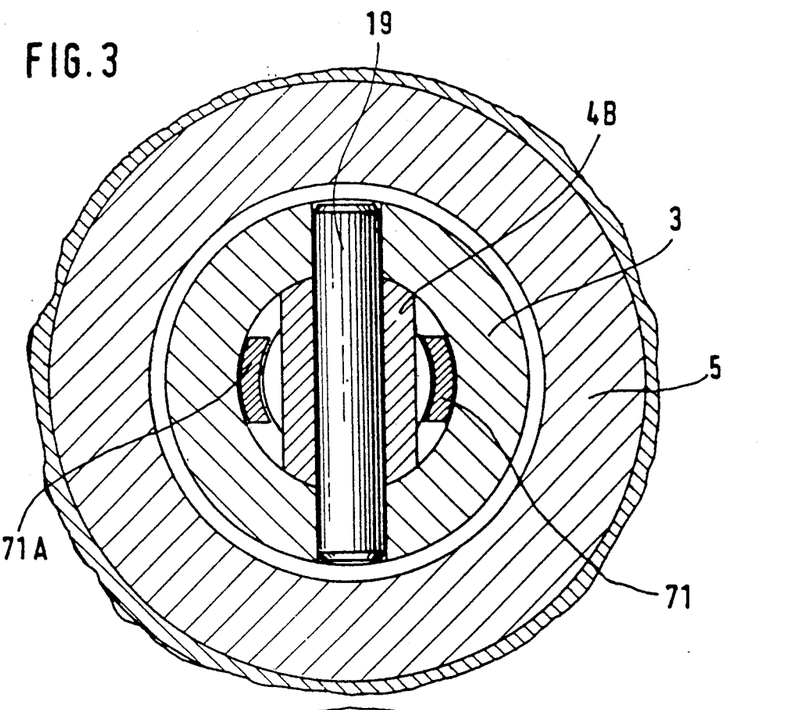
FIG. 3 shows an enlarged cross section along the line III—III in FIG. 1.
Figure 4:
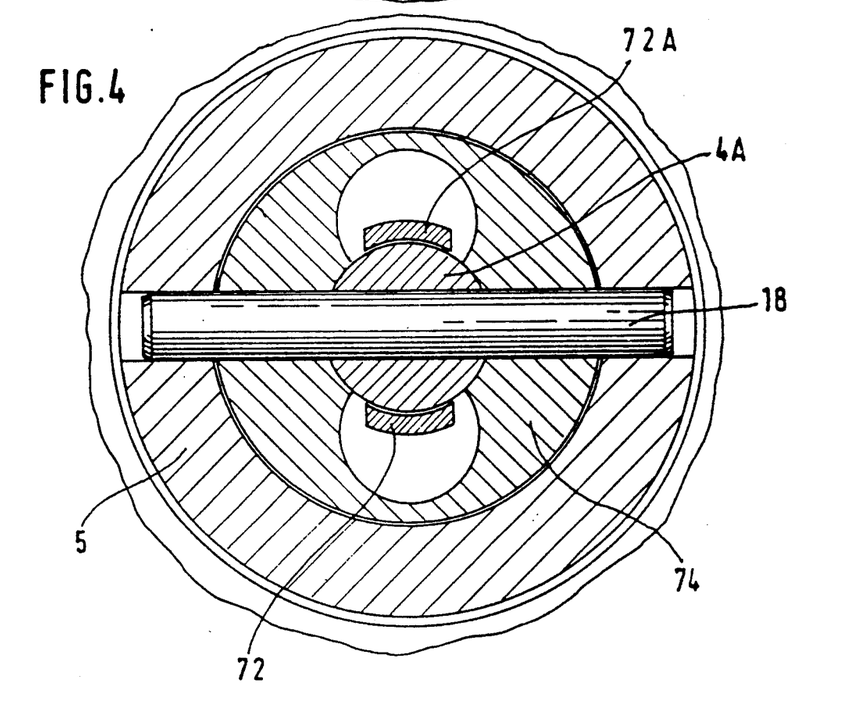
FIG. 4 shows an enlarged cross section along the line IV—IV.

According to FIG. 1, a spring 73 holds the piston valve 60 in the normal position indicated. An electromagnet 67, fastened to a cover 50, that has a plunger 67A that engages with a socket 68 is provided as an adjustment device. The front side of the socket 68 fits against a tube 70 surrounding the torsion bar 4. The thickened end 4A of the torsion bar 4 is connected with the threaded spindle 5 by a pin 18 and its other, flattened, end 4B is connected, free of initial stress, with the steering shaft 3 by another pin 19 (FIG. 2). FIGS. 3 and 4 show that the tube 70 has two bifurcated flanges 71 and 71A lying opposite each other. These flanges are conducted past the flattened end 4B of the torsion bar 4 and the recess 28A in the bolt 28 in such a way that they end up next to the piston valve 60. It can be seen from FIGS. 1 and 4 that the side of the tube 44 facing the electromagnet 67 also has flanges 72 and 72A that lead past beside the pin 18 through a bearing 74. By means of these flanges 71, 71A and 72, 72A provided at both ends of the torsion bar 4, the tube 44 can move axially and act upon the piston valve 60 in activating the electromagnet 67.

Figure 7:
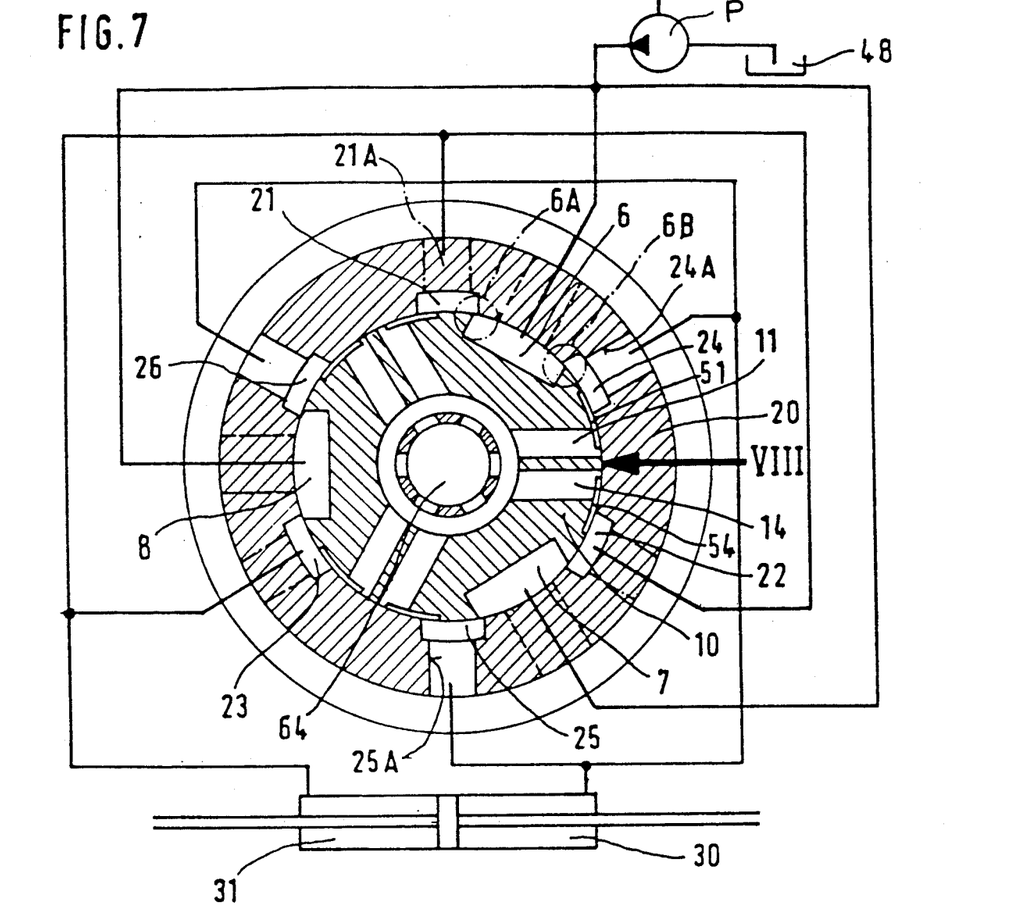
FIG. 7 shows a cross section through the rotary slide valve in neutral position along line VII—VII in FIG. 5.
Figure 8:
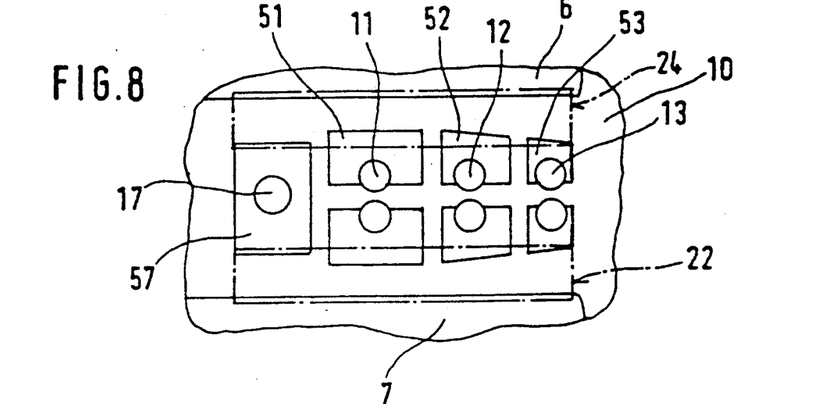
FIG. 8 shows a partial plan view of the rotary slide plan viewed in the direction of the arrow VIII in FIG. 7.

The rotary slide valve works as follows: In FIGS. 7 and 8, the rotary slide valve is shown in its neutral position—i.e., it is not triggering any pressure. It is assumed that the vehicle is operating at high speed. In this case, the electromagnet 67 is not receiving any current, so that the spring 73 holds the piston valve 60 in the normal position shown in FIGS. 2 and 6. Consequently, the flow of pressure oil within the rotary slide valve 10, 20 is again only explained on the basis of one of the three guide-groove and drilled-hole systems that work together. The pressure oil conveyed into the supply guide groove 6 by the engine-driven pump P can flow away over the guiding edges 6A and 6B, which are open on both sides. The pressure oil flows, for example, through the guide groove 24, located clockwise to the right, to the windows 51, 52, 53 and 57 and the return drilled holes 11, 12, 13 and 17 into the drilled hole 64 in the piston valve 60. From there the oil can flow away to the container 48 through the drilled hole 27 and the interior space 46 (FIG. 1).

The position of the guide grooves 22 and 24 in relation to the windows 51, 52, 53 and 54, 55, 56 and 57 can be seen most clearly in the neutral position in FIG. 8 that has been described. The guide grooves 22 and 24 (dot-dash lines) are cut into all the windows. In the normal position of the piston valve 60 (FIG. 6), a return flow of oil through all the windows and return drilled holes is guaranteed. As soon as the vehicle reduces its speed, the electromagnet 67 receives current and the piston valve 60 moves from the normal position in FIG. 6 to the right in the direction of the arrow, so that the annular grooves 61, 62 and 63 no longer unblock the full cross section of the return drilled holes 11, 12, 13 and 14, 15, 16. The return now takes place through the more or less open return drilled holes.

Figure 9:
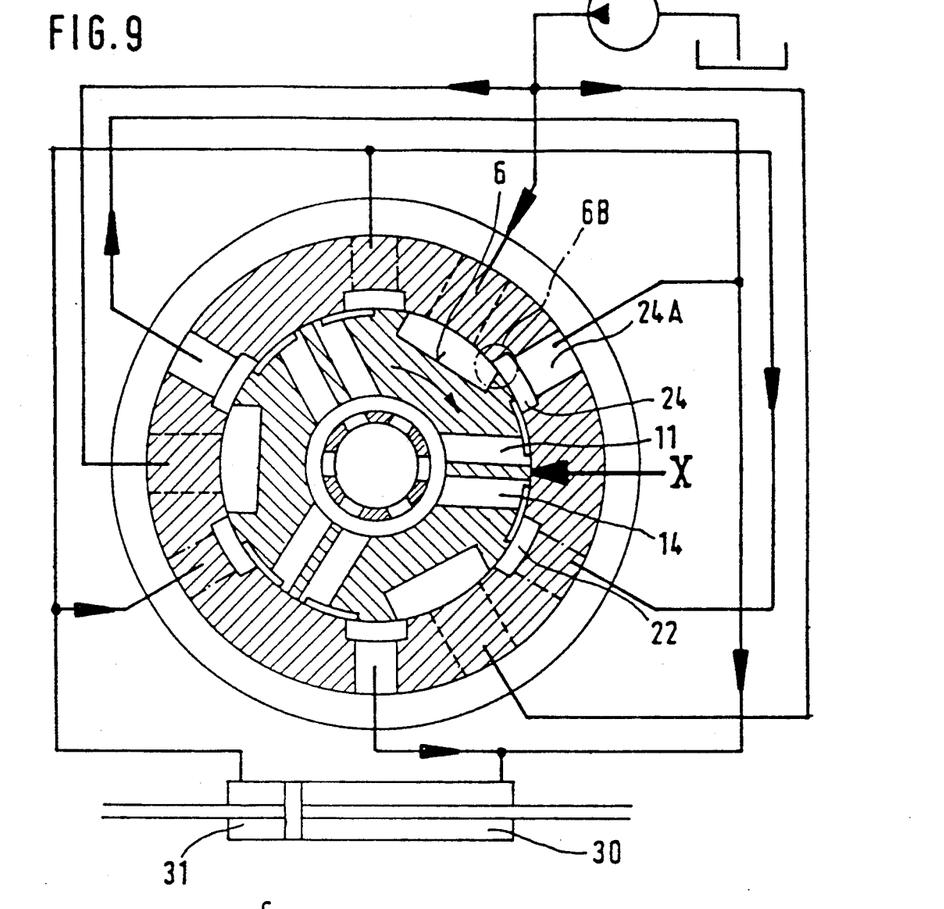
FIG. 9 shows a cross section according to FIG. 7, but in steering position.
Figure 10:
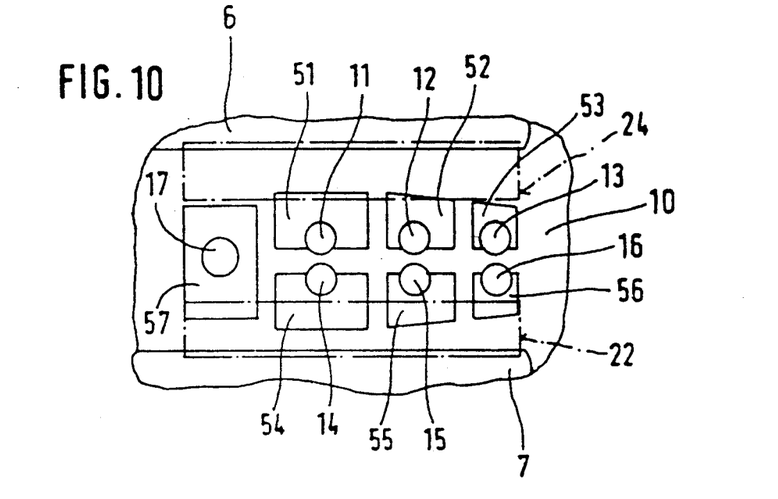
FIG. 10 shows a partial plan view of the rotary slide, viewed in the direction of the arrow X in FIG. 9.

FIGS. 9 and 10 show the rotary slide valve in a steering position with the rotary slide member 10 rotated in the direction of the arrow through a certain amount of angle with respect to the valve sleeve 20. The guiding edge 6B is wide open, so that the pressure oil conveyed through the supply guide groove 6 flows into the guide groove 24 and can flow away through the radial drilled hole 24A into the pressure chamber 30. The gradual build-up of pressure takes place, during this process, as a result of the feeding down of a partial stream through the windows 51 and 52 and through the return drilled holes 11 and/or 12 belonging to them. The partial stream that is fed down can flow away into the return drilled holes 11 and 12 from the annular groove 24 through apertures at the windows 51 and 52 that are still open. However, the guide groove 24 is not connected with the windows 53 and 57 any longer. Since almost the entire circumferential length of the flat windows 51 and 52 is available during this downward feeding, the high pressure can be reduced over a long throttle stretch. No outflow noises arise at the entrance into the return drilled holes 11 and 12.

Assuming that the vehicle is moving at average speed in this driving position, the piston valve 60 is in an intermediate position (not shown) in which it only unblocks partial cross sections of the return drilled holes 11, 12, 13 by means of the annular grooves 61, 62, 63. The momentary return cross section generates a definite operational power at the steering wheel. This operational power is so synchronized in accordance with the speed and other influencing variables that it provides the driver entirely adequate supplementary power support simultaneously with good road contact. The pressure build-up that goes along with this operating condition corresponds approximately to characteristic curve W in FIG. 12. The volume of oil pushed out of the other surge chamber 31 at the same time goes from the guide groove 22, which far overlaps all windows 54 to 57, to the return drilled holes 14 to 17 and can flow away unhindered to the container 48.

Figure 11:
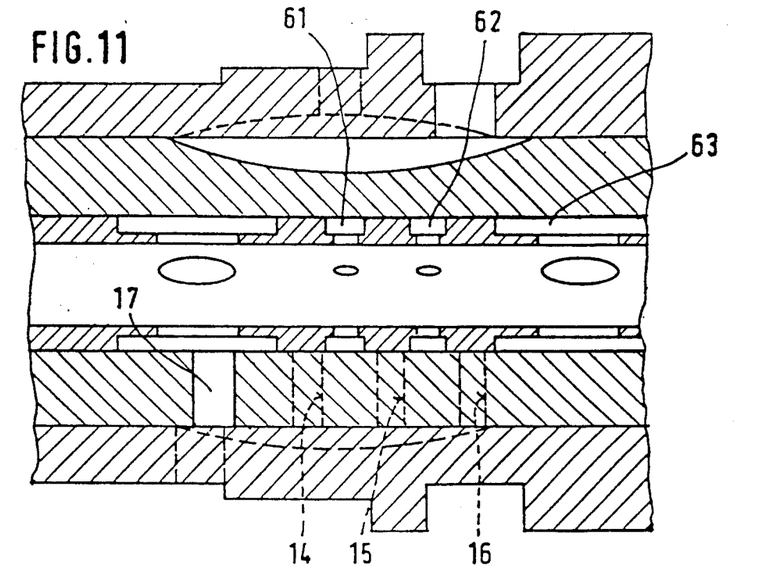
FIG. 11 shows a longitudinal section according to FIG. 6, but in the final position of the piston valve for maximal operating power.

If, for example, the vehicle has only a very little speed when being parked, the electromagnet 67 forces the piston valve 60 into its final position according to FIG. 11. The drilled holes 11, 12, 13 are then completely blocked. When the rotary slide 10 rotates, the downward feeding still takes place only through the window 57 and the return drilled hole 17. FIG. 10 already shows a position of the guide groove 24 in relation to the window 57 in which no more oil can flow over; the pressure triggering is thus already ended and extreme pressure prevails in the pressure chamber 30. As a result of this initially sharply reduced return cross section only by the window 57 and the drilled hole 17, the supplementary power in the surge chamber 30 roses sharply—i.e., the rotary slide 10 must be rotated through only a small angle of rotation with respect to the valve sleeve 20 to trigger a high pressure. Therefore the operating power at the steering wheel also stays relatively small. When this happens, the rotary slide valve produces an increase of pressure, as is shown by the characteristic curve Y in FIG. 12.

Figure 12:
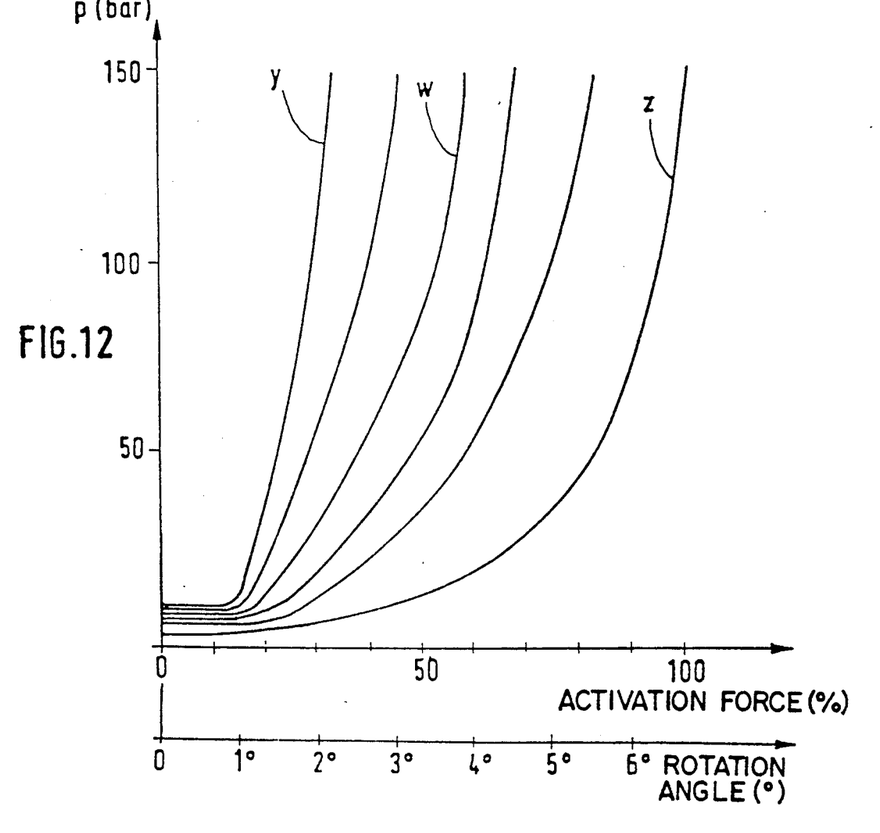
FIG. 12 shows a working pressure - physical effort family of characteristics.

In another assumed operating condition, the vehicle is operating at high speed, at which the driver performs only rather small steering corrections. In this case, the electromagnet 67 again is not receiving any current, so that the piston valve 60 is kept in its normal position, to the left in accordance with FIG. 6, fixed by the spring 73. The rotary slide member 10 is only rotated through a small angle of rotation in the direction of the arrow in FIG. 9. When this happens, the guide groove 24 cuts into all windows 51, 52, 53 and 57, so that relatively large overlapped cross-sections of the return drilled holes 11, 12, 13 and 17 come into being. Since the entire return cross-section of the return drilled holes 11, 12, 13 is open in the normal position of the piston valve 60, the pressure in the active surge chamber 30 rises only slowly because of the angle of rotation. Therefore the operating power at the steering wheel is higher. In this regard, the characteristic curve Z in FIG. 12 shows the path of the increase of pressure.

Any characteristic curves at all matching the current driving condition come into being between the extreme characteristic curves Y and Z in accordance with the position of the piston valve 60 and the rotation position of the rotary slide valve. In this way, variable valve characteristic curves are obtained. The selected special contour of the individual windows—51 to 57, for example—for triggering the working pressure and setting the position of the return drilled holes—11, 12, 13 and 17, for example—in relation to the piston valve is such that an almost infinitely variable modification of the characteristic curve results.

Figure 13:
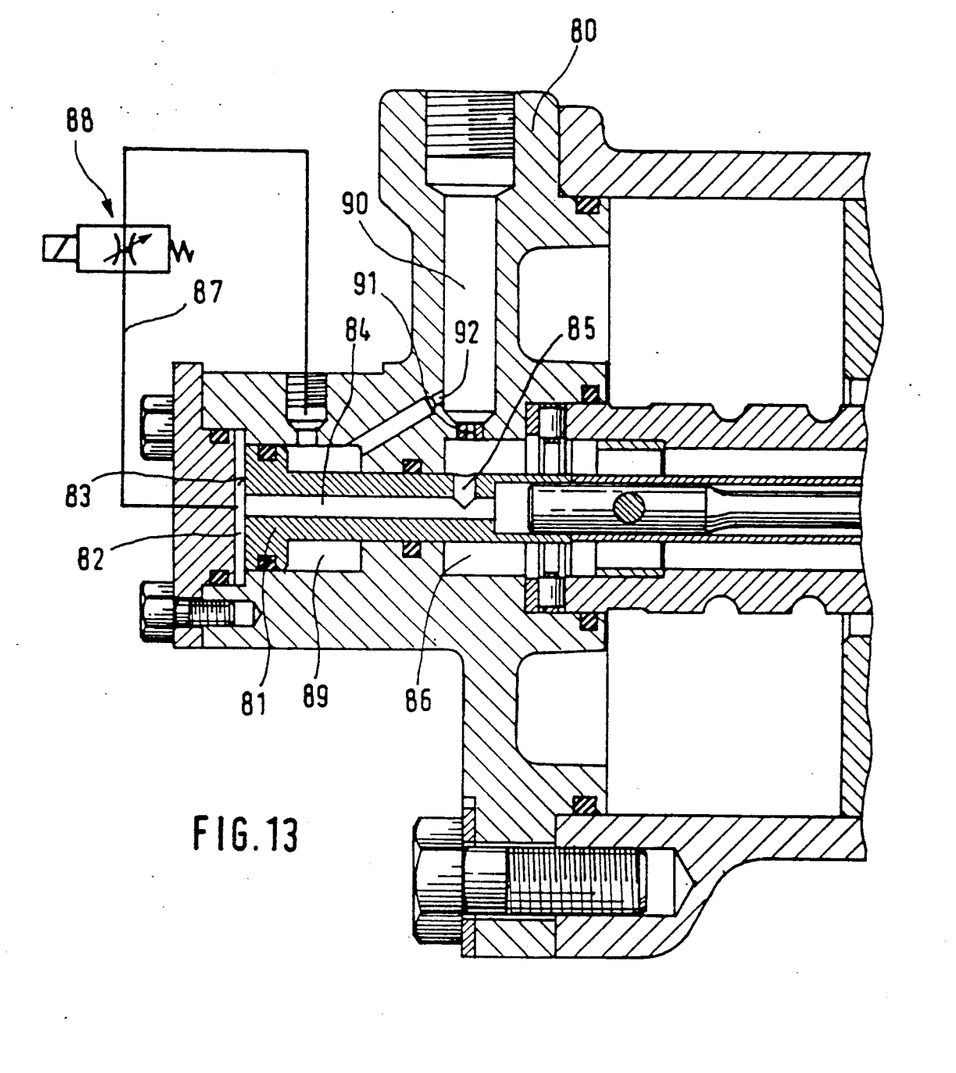
FIG. 13 shows a partial section through an alternate and preferred embodiment.

Instead of an electromagnet 67, the embodiment according to FIG. 13 shows a piston 81 inserted in a casing cover 80. A surge chamber 82 with a face 83 of the piston 81 capable of being put under pressure is connected with a space 86 conveying the return stream by an axial drilled hole 84 and a radial drilled hole 85. The pressure chamber 82 is connected with a chamber 89 located on the back of the piston 81 by a return pipe 87 that contains an electromagnetic flow control valve 88. The chamber 89 is discharged to a return conduit 90 through a throttling port 92. Furthermore, the return drilled hole 90 is connected with the space 86 through another throttling port 91. Depending upon a control signal, the flow control valve 88 builds up the return oil, so that the pressure acting upon the face 83 causes an axial displacement of the piston 81 and also of the piston valve 60 through a tube 70 (FIG. 2).

The throttling port 91 in the return conduit 90, combined with the throttling port 92, ensures that a slight differential pressure can build up in the surge chamber 82 when the flow control valve 88 comes into action.

We claim:

1. A rotary slide valve for hydraulic auxiliary power steering mechanisms for motor vehicles includes a fixed cylindrical valve sleeve (20), a rotary slide member (10) arranged within the valve sleeve and flexibly connected therewith via a torsion bar (4), the valve sleeve containing a plurality of longitudinal grooves (21, 22, 23, 24, 25, 26) in the inner surface thereof and the rotary member containing a plurality of longitudinal grooves (6, 7, 8) in the outer surface thereof, the grooves cooperating to control the pressure of hydraulic fluid guided therethrough for a power cylinder of the steering mechanism, the rotary member containing a plurality of radial bores (11, 12, 13, 14, 15, 16) connected with a tank for the return flow of hydraulic fluid from the valve, the improvement which comprises (a) the bores being arranged in two radially spaced longitudinal rows (9, 9A), the bores of each row being spaced longitudinally;

(b) each row of bores corresponding to one of the grooves in the valve sleeve;

(c) a piston valve (60) arranged within the rotary member for selectively closing the bores; and (d) adjustment means (67) connected with said piston valve for adjusting the position thereof as a function of a variable of the motor vehicle, whereby said piston valve is displaced to selectively open and close the bores, thereby providing variable hydraulic pressure to the power cylinder of the steering mechanism in accordance with the variable of the motor vehicle.

2. Apparatus as defined in claim 1, wherein said adjustment means comprises an electromagnet aligned with the torsion bar, said electromagnet being connected with said piston valve via a tube (70) supported on the torsion bar, and further wherein a spring (73) normally biases said piston valve against said electromagnet.

3. Apparatus as defined in claim 1, wherein said adjustment means comprises a piston (81) aligned with the torsion bar and connected with said piston valve via a tube (70) supported on the torsion bar, said piston containing a surface (82) connected with a supply (86) of return hydraulic fluid, and further comprising an electromagnetic flow control valve (88) arranged in a hydraulic fluid return line adjacent said surface for controlling the pressure of hydraulic fluid applied to said surface, and a spring (73) normally biasing said piston valve against said piston.

4. Apparatus as defined in claim 1, wherein said piston valve contains a bore (64) communicating with the tank, and a plurality of annular grooves (61, 62, 63) in the outer surface thereof corresponding with the spacing of the rotary member radial bores, said piston valve grooves communicating with said piston bore and controlling the passage of hydraulic fluid from the rotary member radial bores to said piston bore, the rotary member containing a median return bore and said piston valve containing an elongated groove (59) arranged between and adjacent the rows of bores in said rotary member, said elongated groove being opposite said median return bore.

5. Apparatus as defined in claim 4, wherein the rotary member radial bores are surrounded by flat portions (51, 52, 53, 54, 55, 56) having different widths, lengths, and contours, the rows of bores being separated hydraulically by a longitudinal arm (58) extending therebetween, said median bore including a flat portion (57) operable in both directions of rotation.

6. Apparatus as defined in claim 5, wherein the flat portion of said median bore is smallest around its circumference.

7. Apparatus as defined in claim 1, wherein said rotary member radial bores are open when said piston valve is in a normal position.

8. Apparatus as defined in claim 2, wherein
(1) the torsion bar is connected with a threaded spindle (5) of said valve sleeve via a first pin (18) and with a steering shaft (3) of the motor vehicle via a second pin (19), said steering shaft and said spindle being coupled together by a bolt (28) permitting a circumferential backlash,
(2) said tube includes two flanges (71, 71A, 72, 72A) at each end thereof, said flanges being opposite each other;
(3) said bolt contains a recess (28A);
(4) the torsion bar has one flattened end (4B) facing said piston valve;
(5) said flanges extend beyond said torsion bar flattened end and beyond said bolt recesses with the faces of said flanges resting against said piston valve; and
(6) said flanges are located adjacent said first pin in the area of a thicker end of the torsion bar and rest against a socket of said electromagnet.

* * * * *